(12) United States Patent
Huang et al.

(10) Patent No.: US 8,175,861 B2
(45) Date of Patent: May 8, 2012

(54) MACHINING SIMULATION METHOD AND MACHINING SIMULATION APPARATUS

(75) Inventors: Bin Huang, West Sacramento, CA (US); Xiaodong Tian, West Sacramento, CA (US); Tetsuo Ogawa, West Sacramento, CA (US); Bingyan Zhao, West Sacramento, CA (US)

(73) Assignee: Mori Seiki Co., Ltd., Yamatokoriyama-shi (JP)

( * ) Notice: Subject to any disclaimer, the term of this patent is extended or adjusted under 35 U.S.C. 154(b) by 487 days.

(21) Appl. No.: 12/427,121

(22) Filed: Apr. 21, 2009

(65) Prior Publication Data

US 2009/0265030 A1    Oct. 22, 2009

Related U.S. Application Data

(60) Provisional application No. 61/046,595, filed on Apr. 21, 2008.

(51) Int. Cl.
*G06F 7/48* (2006.01)
*G06F 17/50* (2006.01)
*G06F 9/44* (2006.01)
*G06F 19/00* (2011.01)

(52) U.S. Cl. .................. 703/13; 703/3; 703/6; 700/159; 700/186; 700/193; 717/120; 717/127; 717/135

(58) Field of Classification Search .............. 700/97–98, 700/118, 159–160, 163, 175, 186–187, 192–193, 700/195, 253–254; 703/3, 6, 13; 382/154; 345/419–421; 717/120, 127, 135
See application file for complete search history.

(56) References Cited

U.S. PATENT DOCUMENTS

| | | | | |
|---|---|---|---|---|
| 4,477,822 A * | 10/1984 | Luoma et al. | ................. | 346/136 |
| 4,871,252 A * | 10/1989 | Beni et al. | ..................... | 356/457 |
| 5,301,284 A * | 4/1994 | Estes et al. | ..................... | 711/203 |
| 5,832,183 A * | 11/1998 | Shinohara et al. | ............. | 706/20 |
| 6,772,038 B2 * | 8/2004 | Kadono | ........................ | 700/159 |
| 6,775,403 B1 * | 8/2004 | Ban et al. | ...................... | 382/154 |
| 6,988,660 B2 * | 1/2006 | Tsikos et al. | ................. | 235/454 |
| 7,269,471 B2 * | 9/2007 | Kadono | ........................ | 700/159 |
| 7,496,411 B2 * | 2/2009 | Nakamura | ..................... | 700/11 |
| 7,818,091 B2 * | 10/2010 | Kazi et al. | .................... | 700/259 |
| 7,852,355 B2 * | 12/2010 | Friedrich et al. | ............. | 345/633 |
| 2001/0000805 A1 * | 5/2001 | Kadono | ....................... | 700/182 |

(Continued)

FOREIGN PATENT DOCUMENTS

JP 2006-085485 A 3/2006

*Primary Examiner* — Ramesh Patel
(74) *Attorney, Agent, or Firm* — Westerman, Hattori, Daniels & Adrian, LLP (57) ABSTRACT

A machining simulation apparatus is arranged in a machine tool having a tool holding mechanism, a workpiece holding mechanism, a drive mechanism and a numerical controller, and provided with: an actual CCD camera for imaging a tool held by the tool holding mechanism and the workpiece holding mechanism not holding a workpiece to generate actual image data; a model data update processing section for generating model data relating to when moving the holding mechanisms based on the operation command received from the numerical controller and the model data of the holding mechanisms, tool and workpiece; a virtual image generation processing section for generating virtual image data of the tool and workpiece based on the generated model data; and a rendering processing section for generating composite image data by superimposing the virtual image on the actual image, and displaying the composite image data on a screen display device.

6 Claims, 7 Drawing Sheets

U.S. PATENT DOCUMENTS

| | | | |
|---|---|---|---|
| 2002/0082742 A1* | 6/2002 | Kadono | 700/160 |
| 2002/0118229 A1* | 8/2002 | Batori et al. | 345/771 |
| 2002/0133264 A1* | 9/2002 | Maiteh et al. | 700/182 |
| 2004/0093103 A1* | 5/2004 | Nakamura | 700/96 |
| 2004/0181305 A1* | 9/2004 | Hertinger | 700/178 |
| 2007/0088526 A1* | 4/2007 | Friedrich et al. | 702/150 |
| 2008/0091394 A1* | 4/2008 | Hahn et al. | 703/7 |
| 2009/0015668 A1* | 1/2009 | Tian et al. | 348/92 |
| 2009/0070077 A1* | 3/2009 | Tian et al. | 703/1 |
| 2009/0259444 A1* | 10/2009 | Dolansky et al. | 703/2 |

* cited by examiner

(a) Actual image (b) Virtual image (c) Composite image

Fig. 4

(a) Actual image (b) Virtual image (c) Composite image

MACHINING SIMULATION METHOD AND MACHINING SIMULATION APPARATUS

TECHNICAL FIELD

The present invention relates to a machining simulation method and a machining simulation apparatus for performing a machining simulation in a machine tool while displaying a simulation image on its screen display means.

BACKGROUND ART

The machine tool is provided with a tool holding mechanism for holding a tool, a workpiece holding mechanism for holding a workpiece, a drive mechanism for operating one or both of the holding mechanisms, and a control device for controlling the operation of the drive mechanism. The control device controls the drive mechanism on the basis of an NC program.

The NC program is created by an operator using a manual program creating device or an automatic programming device, and before continuous machining is performed using the created NC program, it is verified whether the NC program has an error.

The NC program verification is performed by an operator, for example, watching a displayed image of a tool and workpiece which move in accordance with the NC program and checking the moving state of the tool and the machining state. As an apparatus which is used for such verification, for example, an NC machining simulation apparatus disclosed in Japanese Unexamined Patent Application Publication No. 2006-85485 is known.

This NC machining simulation apparatus is provided with: a main control section; a display device; a machining program memory for storing a NC program; a model memory for storing data of three-dimensional models of a tool, workpiece, tool rest for holding the tool, chuck for holding the workpiece, and spindle on which the chuck is mounted; a program-analysis-processing control section for analyzing the NC program stored in the machining program memory; a simulation control section for calculating a moving path of the tool on the basis of the program analysis performed by the program-analysis-processing control section; a model-processing control section for calculating model data of the tool, workpiece, tool rest, chuck and spindle which are moved relative to one another along the moving path of the tool on the basis of the result of the calculation performed by the simulation control section and the model data in the model memory; a model-plotting-processing control section for generating image data on the basis of the model data calculated by the model-processing control section and other components. The image data generated by the model-plotting-processing control section is displayed on the display device under the display control of the main control section.

SUMMARY OF INVENTION

Technical Problem

However, when the model data of a tool; workpiece, tool rest, chuck, spindle etc. are updated on the basis of an NC program and image data for simulation is generated on the basis of only the updated model data like the above conventional NC machining simulation apparatus, a problem as described below occurs.

That is, a part of the model data configuring the machine tool is simplified or omitted in order to increase the processing speed of the model data update processing and the image data generation processing, and in order to reduce load on the processing sections for performing these processings. Thereby, a realistic machining simulation cannot be performed, and an accurate machining simulation cannot also be performed.

Further, in this way, when a realistic and accurate machining simulation cannot be performed, it must be verified whether the NC program has a malfunction by actually operating the machine tool after performing the machining simulation. This causes a problem of inefficiency.

The present invention has been achieved in view of the above-described circumstances, and an object thereof is to provide a machining simulation method and a machining simulation apparatus capable of performing a realistic and accurate machining simulation.

Solution to Problem

The present invention, for achieving the above-described object, relates to a machining simulation method in a machine tool having: tool holding means for holding a tool; workpiece holding means for holding a workpiece; drive means for operating one or both of the holding means; drive control means for controlling the operation of the drive means on the basis of a command to operate one or both of the holding means; and screen display means for displaying image data, the machining simulation method comprising:

an actual operation step of operating one or both of the holding means by controlling the drive means by means of the drive control means on the basis of the operation command;

a model generating step in which model data of the holding means, tool, and workpiece relating to when one or both of the holding means are gradually moved according to the operation command are in turn generated on the basis of the operation command and data of three-dimensional models of the holding means, tool and workpiece;

an actual image generating step of in turn generating two-dimensional image data of the tool holding means and workpiece holding means being in a state where one or both of the tool and workpiece are not held by imaging them by means of imaging means from a predetermined view point at a certain time interval;

a virtual image generating step of generating two-dimensional image data of at least the tool and workpiece on the basis of the model data generated in the model generating step, the virtual image generating step in which a three-dimensional space is virtually set, the three-dimensional models of the tool and workpiece are arranged in the three-dimensional space and imaging means having the same condition as the actual imaging means is virtually set and arranged, and two-dimensional image data which is assumed to be obtained when the tool and workpiece represented by three-dimensional models are imaged by the virtual imaging means from the same view point and at the same timing as those of the actual imaging means is in turn generated; and a rendering step in which, on the basis of the actual two-dimensional image data and the virtual two-dimensional image data which are generated at the same timing in the actual image generating step and the virtual image generating step, respectively, composite image data which is generated by superimposing a virtual two-dimensional image on an actual two-dimensional image is in turn generated and displayed on the screen display means.

The machining simulation method can be preferably performed by the following machining simulation apparatus.

That is, the machining simulation apparatus is configured to comprise:

imaging means for imaging the tool holding means and workpiece holding means being in a state where one or both of the tool and workpiece are not held from a predetermined view point at a certain time interval to generating two-dimensional image data;

model data storage means for storing data of the three-dimensional models of the holding means, tool and workpiece;

model data updating means for receiving the operation command from the drive control means and in turn generating, on the basis of the received operation command and the model data stored in the model data storage means, model data of the holding means, tool and workpiece relating to when one or both of the holding means are gradually moved according to the operation command to update the model data stored in the model data storage means with the generated model data;

virtual image generating means for generating two-dimensional image data of at least the tool and workpiece on the basis of the model data stored in the model data storage means, the virtual image generating means in which a three-dimensional space is virtually set, the three-dimensional models of the tool and workpiece are arranged in the three-dimensional space and imaging means having the same condition as the actual imaging means is virtually set and arranged, and two-dimensional image data which is assumed to be obtained when the tool and workpiece represented by three-dimensional models are imaged by the virtual imaging means from the same view point and at the same timing as those of the actual imaging means is in turn generated; and rendering means in which, on the basis of the actual two-dimensional image data and virtual two-dimensional image data which are generated at the same timing by the actual imaging means and the virtual imaging means, respectively, composite image data which is generated by superimposing a virtual two-dimensional image on an actual two-dimensional image is in turn generated and displayed on the screen display means.

In this machining simulation apparatus, the drive means is controlled by the drive control means on the basis of a command to operate one or both of the tool holding means and the workpiece holding means, thereby, one or both of the holding means are moved. At the same time as the actual movements of the holding means, the update of the model data of the holding means, tool and workpiece is performed by the model data updating means.

Specifically, the model data updating means receives an operation command from the drive control means. And, on the basis of the received operation command and the model data stored in the model data storage means, the model data updating means in turn generates model data of the holding means, tool and workpiece relating to when one or both of the holding means are gradually moved according to the operation command to update the model data stored in the model data storage means with the generated model data.

During the operation of the holding means, the tool holding means and workpiece holding means being in a state where one or both of the tool and workpiece are not hold are imaged by the actual imaging means from a predetermined view point at a certain time interval, whereby two-dimensional image data is in turn generated. It is sufficient to image the tool holding means and the workpiece holding means so that at least the images of them can be obtained. However, in order to perform a more realistic and accurate machining simulation, it is preferable that the generated two-dimensional image data includes other components of the machine tool in addition to a part of or the entire tool holding means and a part of or the entire workpiece holding means.

Two-dimensional image data of at least the tool and workpiece is generated by the virtual image generating means on the basis of the model data stored in the model data storage means. The virtual two-dimensional image data is virtual two-dimensional image data which is assumed to be obtained when a three-dimensional space is virtually set; the three-dimensional models of the tool and workpiece are arranged in the three-dimensional space and imaging means having the same condition (the same intrinsic parameter, for example) as the actual imaging means is virtually set and arranged; and the tool and workpiece represented by three-dimensional models are imaged by the virtual imaging means from the same view point and at the same timings as those of the actual imaging means. Such two-dimensional image data is in turn generated in synchronization with the imaging timing of the actual imaging means.

Thereafter, on the basis of the actual two-dimensional image data and virtual two-dimensional image data which are generated at the same timing by the actual imaging means and the virtual imaging means, respectively, composite image data which is generated by superimposing a virtual two-dimensional image on a actual two-dimensional image is in turn generated and displayed on the screen display means by the rendering means. The composite image data is usually generated by superimposing the virtual two-dimensional image (images of the tool and workpiece obtained from the model data) on the positions in the actual two-dimensional image where the tool and workpiece should be held by the tool holding means and the workpiece holding means, respectively.

Thus, according to the machining simulation method and the machining simulation apparatus of the present invention, because the composite image in which the tool and the workpiece are the images obtained from the virtual imaging means and the rest is the image obtained from the actual imaging means is displayed on the screen display means, an operator can check the operations of the tool and workpiece represented by virtual images while checking the actual condition of the machine tool. Thereby, it is possible to perform a more realistic and accurate machining simulation.

Although the tool and workpiece are the images obtained from the virtual imaging means, when the model data of the tool and workpiece match the actual geometries thereof and the arrangement position of the workpiece in the virtual three-dimensional space matches the actual arrangement position thereof, it is not necessary to actually operate the machine tool after performing the machining simulation to verify the NC program. Therefore, the NC program verification can be completed after performing only the machining simulation, which is efficient.

The actual imaging means may be configured to image the tool held by the tool holding means and the workpiece held by the workpiece holding means from the predetermined view point at a certain time interval and in turn generate two-dimensional image data, and the rendering means may be configured to generate composite image data in which the virtual two-dimensional image is translucent and display it on the screen display means.

When configured in this way, it is possible to check the actual two-dimensional image through the translucent virtual two-dimensional image. Therefore, the operator can verify whether the model data of the tool and workpiece match the actual geometries thereof by comparing the images of the tool and workpiece obtained from the model data with the actual images thereof, and whether the arrangement position of the workpiece in the virtual three-dimensional space matches the actual arrangement position thereof. When they match, it is possible to omit the actual operation of the machine tool to verify the NC program as described above.

ADVANTAGEOUS EFFECTS OF INVENTION

Thus, according to the machining simulation method and the machining simulation apparatus of the present invention, it is possible to perform a realistic and accurate machining simulation.

DESCRIPTION OF EMBODIMENT

Figure 1:
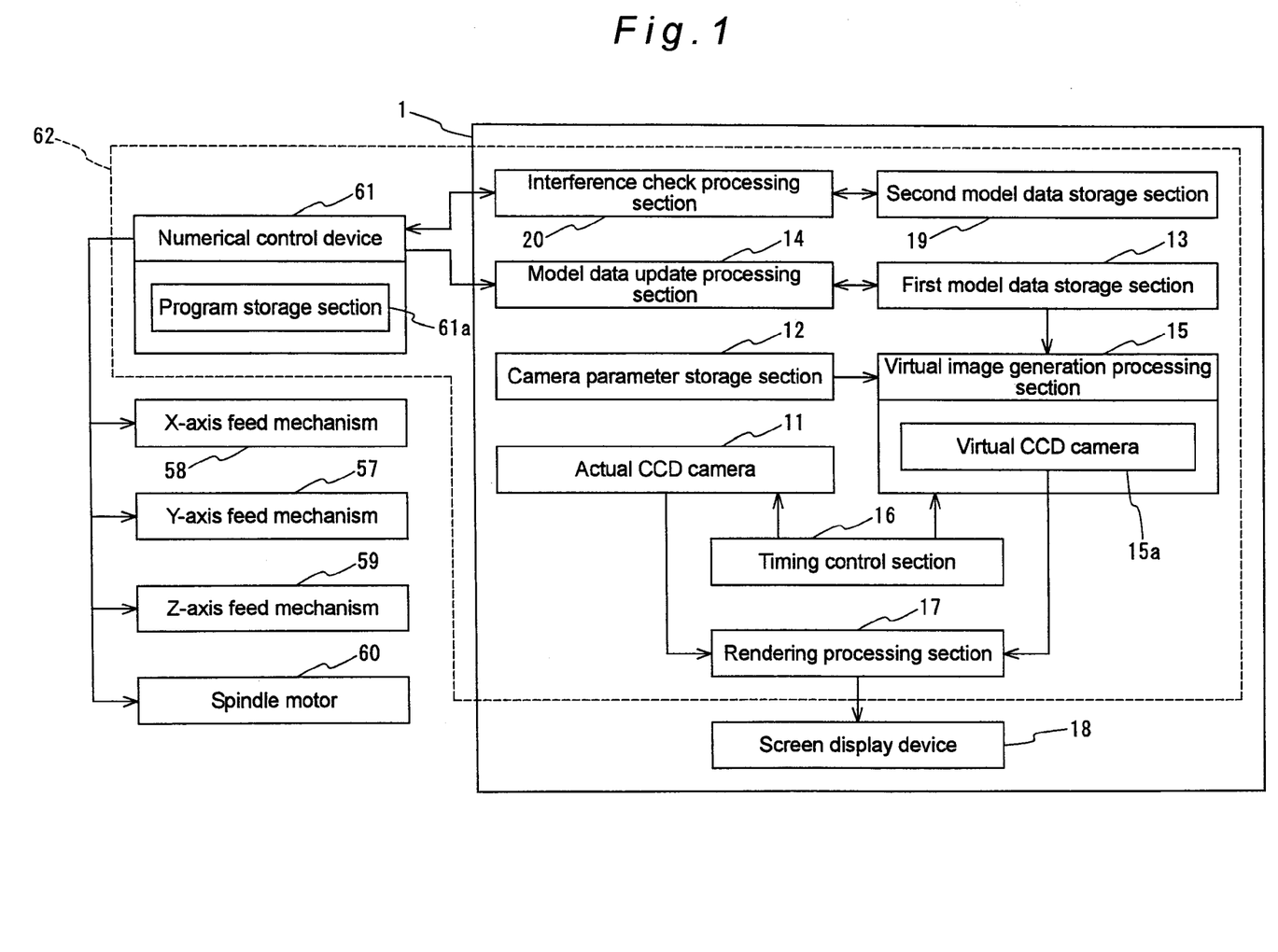
FIG. 1 is a block diagram showing a schematic configuration of a machining simulation apparatus and other components according to one embodiment of the present invention.

Hereinafter, a specific embodiment of the present invention will be explained with reference to the accompanying drawings. FIG. 1 is a block diagram showing a schematic configuration of a machining simulation apparatus and other components according to one embodiment of the present invention, and FIG. 2 is a perspective view showing a schematic configuration of a machine tool provided with the machining simulation apparatus of the embodiment.

Figure 2:
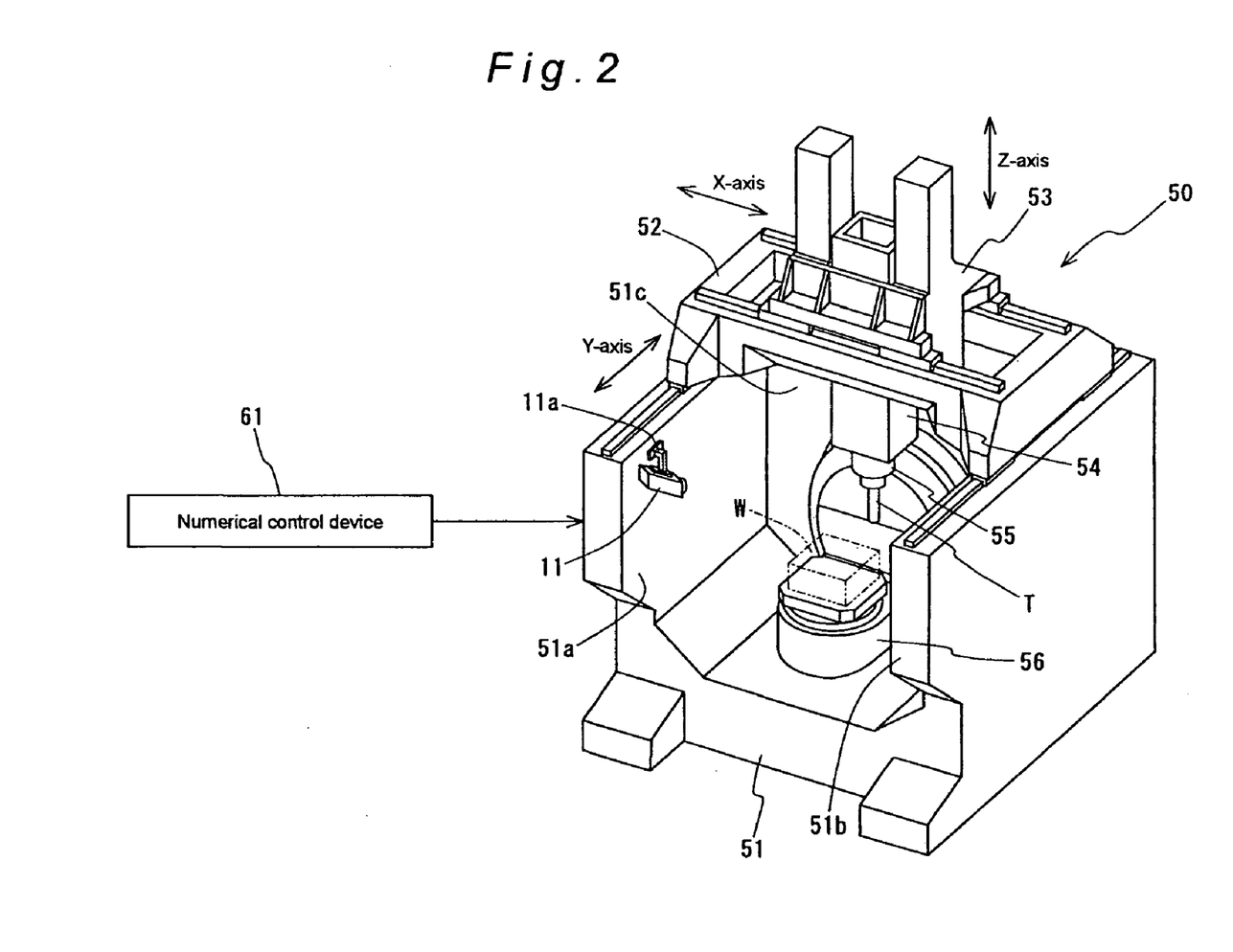
FIG. 2 is a perspective view showing a schematic configuration of a machine tool provided with the machining simulation apparatus of the embodiment.

A machining simulation apparatus 1 of the present embodiment, as shown in FIG. 1, has an actual CCD camera (actual imaging means) 11, a camera parameter storage section 12, a first model data storage section (model data storage means) 13, a model data update processing section (model data updating means) 14, a virtual image generation processing section (virtual imaging means) 15, a timing control section 16, a rendering processing section (rendering means) 17, a screen display device (screen display means) 18, a second model data storage section 19 and an interference check processing section 20, and is provided in a machine tool 50 called a machining center such as shown in FIG. 2, for example.

First, the machine tool 50 is explained. As shown in FIGS. 1 and 2, the machine tool 50 is provided with: a bed 51; a first saddle 52 which is disposed on the bed 51 and which can move freely in a horizontal back-and-forth direction (Y-axis direction); a second saddle 53 which is disposed on the first saddle 52 and can move freely in a horizontal side-to-side direction (X-axis direction); a spindle head 54 which is supported by the second saddle 53 and which can move freely in the vertical direction (Z-axis direction); a spindle (tool holding means) 55 which is supported by the spindle head 54 so that its axis is parallel to the Z-axis and so as to be rotatable about its axis and which has a tool T mounted to the lower end portion thereof; a table (workpiece holding means) 56 which is disposed to the bed 51, and on which a workpiece W is mounted; a Y-axis feed mechanism 57, X-axis feed mechanism 58 and Z-axis feed mechanism 59 for respectively moving the first saddle 52, second saddle 53 and spindle head 54 in their respective moving directions; a spindle motor 60 for rotating the spindle 55 about its axis; and a numerical control device (drive control means) 61 for controlling the operations of the feed mechanisms (drive means) 57, 58 and 59 and spindle motor 60.

The numerical control device 61 is provided in the control device 62. Further, the camera parameter storage section 12, the first model data storage section 13, the model data update processing section 14, the virtual image generation processing section 15, the timing control section 16, the rendering processing section 17, the second model data storage section 19 and the interference check processing section 20 are also provided in the control device 62.

The bed 51 has a configuration where side walls 51a, 51b and 51c are provided on the right, left and back sides thereof, respectively. The first saddle 52 is disposed on the upper portions of the side walls 51a and 51b on the right and left sides, and the table 56 is disposed to the back side wall 51c.

The numerical control device 61 includes a program storage section 61a in which a previously generated NC program is stored, and controls the feed mechanisms 57, 58 and 59 and the spindle motor 60 on the basis of the NC program stored in the program storage section 61a. Specifically, the numerical control device 61 analyzes the NC program block by block, and in turn extracts operation commands related to the moving positions and feed speed of the first saddle 52, second saddle 53 and spindle head 54, the rotation speed of the spindle 55 and the like. On the basis of the extracted operation commands and on the basis of feedback signals from the feed mechanisms 57, 58 and 59 and the spindle motor 60, the numerical control device 61 controls the feed mechanisms 57, 58 and 59 and the spindle motor 60.

The numerical control device 61 is adapted to transmit the extracted operation commands to the model data update processing section 14. Further, the numerical control device predicts positions of the first saddle 52, second saddle 53 and spindle head 54 after a lapse of a predetermined time period (600 milliseconds, for example) on the basis of, for example, the present positions and speed and moving directions of the first saddle 52, second saddle 53 and spindle head 54, and transmits the predicted positions to the interference check processing section 20. Additionally, the numerical control device 61 halts the operations of the feed mechanisms 57, 58 and 59 and spindle motor 60 when receiving an alarm signal transmitted from the interference check processing section 20.

Next, the machining simulation apparatus 1 is explained. As described above, the machining simulation apparatus 1 is provided with the actual CCD camera 11, the camera parameter storage section 12, the first model data storage section 13, the model data update processing section 14, the virtual image generation processing section 15, the timing control section 16, the rendering processing section 17, the screen display device 18, the second model data storage section 19 and the interference check processing section 20.

Figure 3:
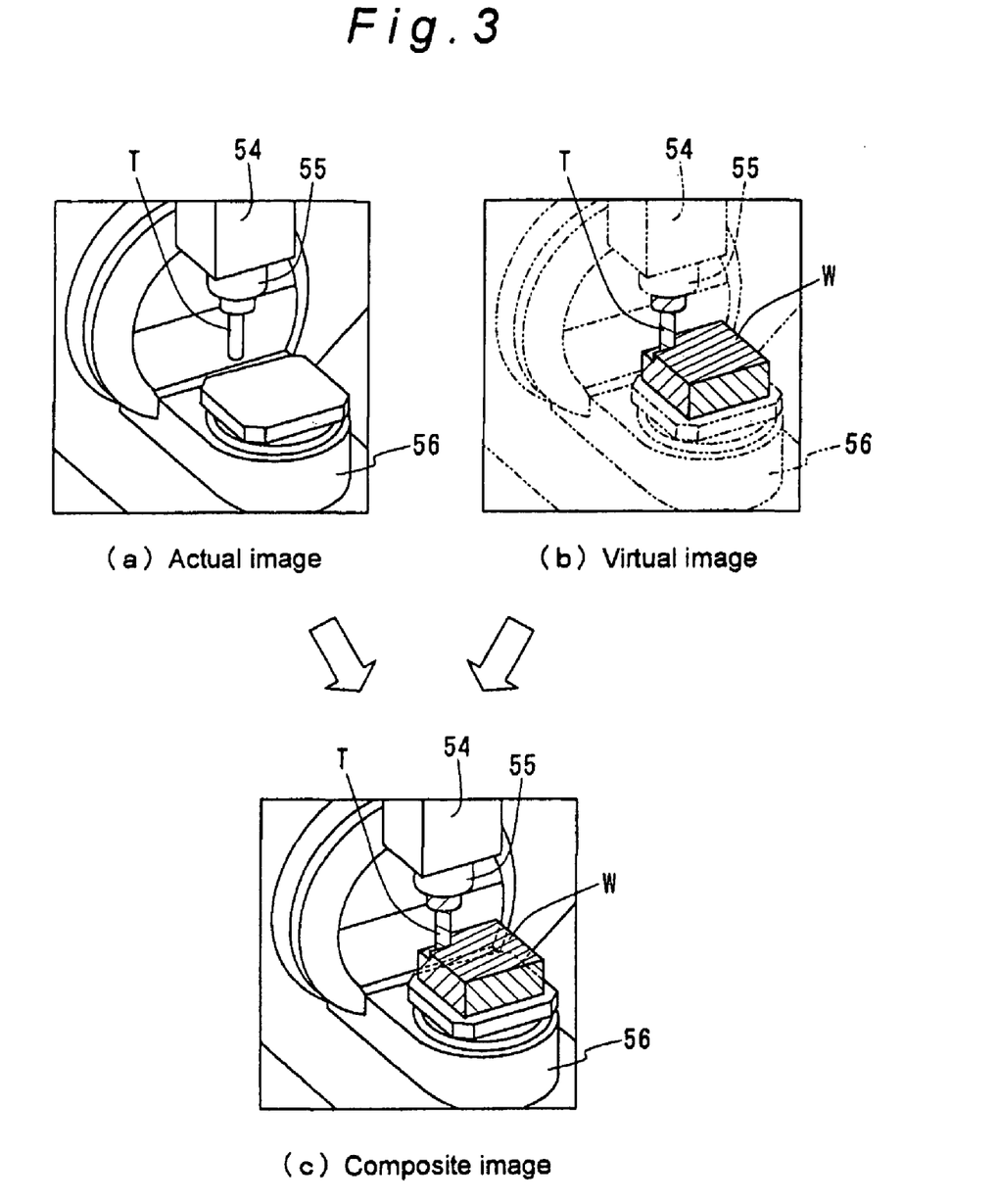
FIG. 3 is an illustration showing an example of images generated by an actual CCD camera, a virtual image generation processing section and a rendering processing section of the embodiment.

As shown in FIG. 2, the actual CCD camera 11 is mounted to the upper portion of the left side wall 51a of the bed 51 via a bracket 11a. The actual CCD camera 11 images an area including the spindle 55 to which the tool T is mounted and the table 56 on which the workpiece W is not mounted at a certain time interval, and generates two-dimensional image data (actual image data) thereof in turn. And the generated two-dimensional image data are outputted to the rendering processing section 17. An example of the image generated at this time is shown in FIG. 3(a). As shown in FIG. 3(a), this image includes a part of the bed 51, a part of the spindle head 54, a part of the spindle 55 and a part of the table 56 in addition to the tool T.

Figure 4:
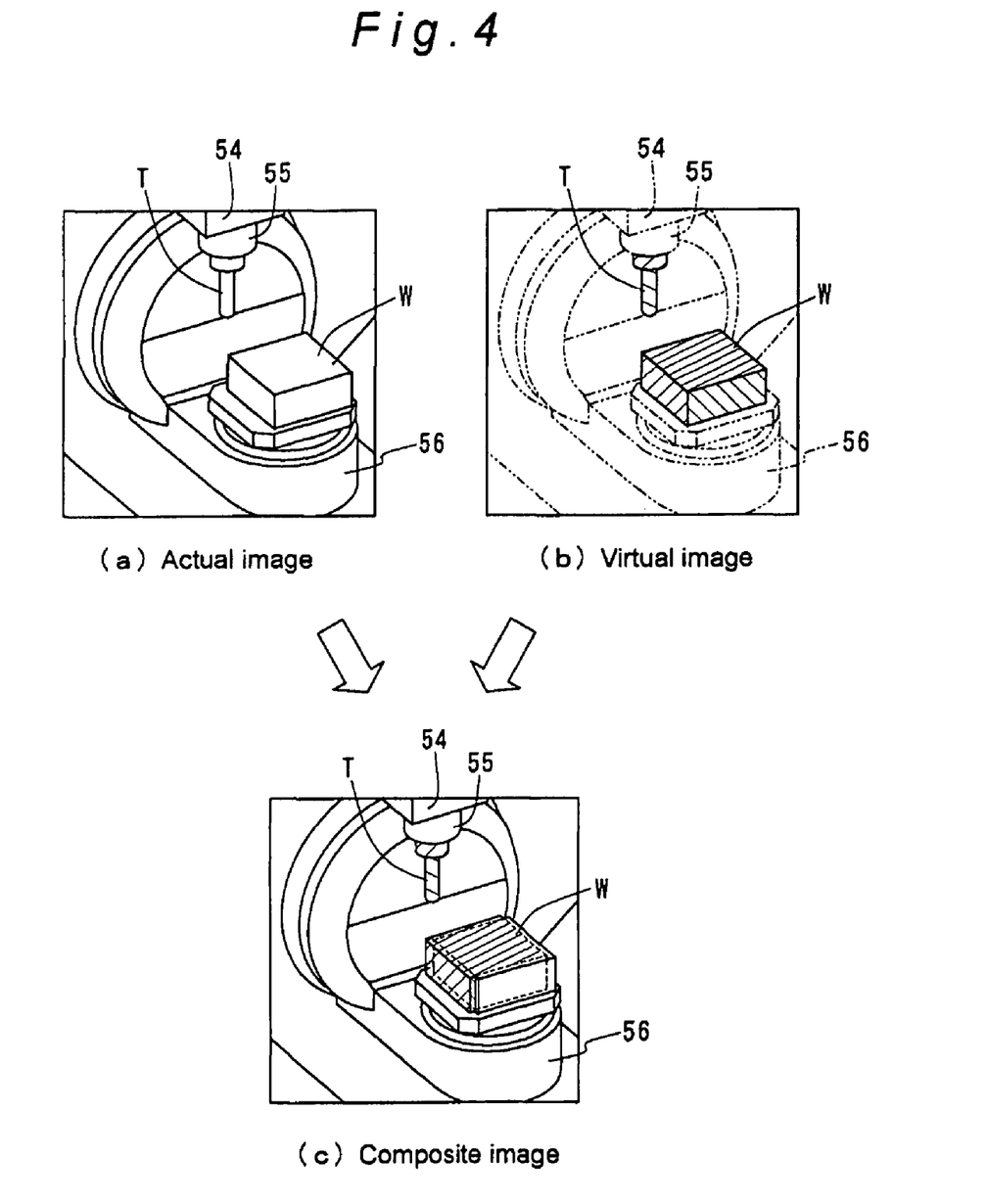
FIG. 4 is an illustration showing an example of the images generated by the actual CCD camera, the virtual image generation processing section and the rendering section of the embodiment.

Further, the actual CCD camera 11 is adapted to image an area including the spindle 55 to which the tool T is mounted and the table 56 on which the workpiece W is mounted, generate two-dimensional image data (actual image data) thereof, and then output the generated two-dimensional image data to the rendering processing section 17. An example of the image generated at this time is shown in FIG. 4(a). As shown in FIG. 4(a), this image includes a part of the bed 51, a part of the spindle head 54, a part of the spindle 55 and a part of the table 56 in addition to the tool T and the workpiece W.

In the camera parameter storage section 12, intrinsic parameter which is characteristic parameter of the actual CCD camera 11 and extrinsic parameter which represents the position and orientation of the actual CCD camera 11 in the coordinate system of the machine tool 50 are stored. These parameters are previously calculated by a calibration processing. The intrinsic parameter includes, for example, a principal point coordinate, a scale factor, skewness of the two image axes and the like.

In the first model data storage section 13, for example, previously generated data of a three-dimensional model (model data) of the entire machine tool 50. The model data of the entire machine tool 50 includes the model data of the main components of the machine tool 50 such as the bed 51, the first saddle 52, the second saddle 53, the spindle head 54, the spindle 55 and the table 56, the model data of the tool T mounted to the spindle 55, and the model data of the workpiece W mounted on the table 56, and the model data of the components, tool T and the workpiece W are related to one another.

Figure 5:
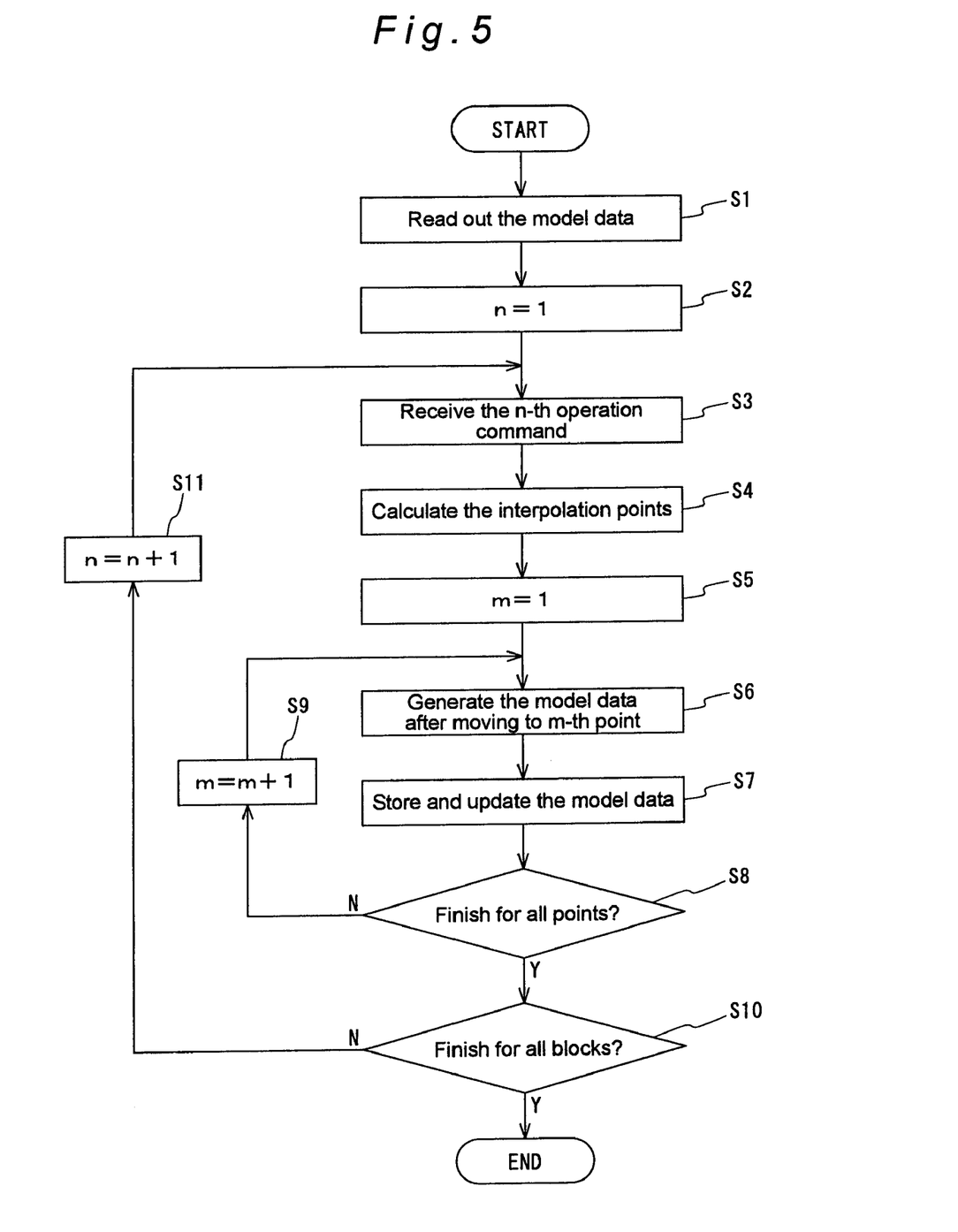
FIG. 5 is a flow chart showing a series of processes in a model data update processing section of the embodiment.

The model data update processing section 14 performs a series of processes such as shown in FIG. 5 to update the model data of the entire machine tool 50 stored in the first model data storage section 13. The update processing is performed synchronously with the actual movements of the first saddle 52, second saddle 53 and spindle head 54.

As shown in FIG. 5, first, the model data update processing section 14 reads out the model data of the entire machine tool 50 stored in the first model data storage section 13 (step S1), and thereafter sets a counter n to 1 (step S2) and receives from the numerical control device 61 the operation command in the first block of the machining program (step S3).

Next, the model data update processing section 14 recognizes the operation command which have been received in step S3, and calculates interpolation points (step S4). For example, when the recognized operation command is a command to move the first saddle 52, the second saddle 53 and the spindle head 54, the model data update processing section 14 sets a plurality of interpolation points on their respective moving paths between their respective movement start points and movement end points, and calculates the positions of each interpolation point. By such interpolation, as described later, the model data of the first saddle 52, second saddle 53 and spindle head 54 which gradually move from their respective movement start points toward their respective movement end points are generated.

Thereafter, the model data update processing section 14 sets a counter m to 1 (step S5) and generates the model data of the first saddle 52, second saddle 53 and spindle head 54 which are each moved to the first point on their respective moving paths (step S6). At this time, if the model data of the tool T and the model data of the workpiece W partially overlap each other, the model data update processing section 14 calculates the overlap area (cutting area) by means of Boolean calculation and generates the model data of the workpiece W so that the cutting area is removed from the workpiece W. Thereafter, in step S7, the generated model data is stored in the first model data storage section 13 to update the model data in the first model data storage section 13.

And while updating the counter m, the processes of steps S6 and S7 are repeated until the model data of the first saddle 52, second saddle 53 and spindle head 54 are each moved to the last point on their respective moving paths (that is, the moving positions according to the movement command) and the model data in the first model data storage section 13 is updated (steps S8 and S9).

Further, while updating the counter n, the processess of steps S3 to S9 are also performed to all blocks in the machining program (steps S10 and S11). Thereafter, the series of processes is terminated.

The virtual image generation processing section 15 generates two-dimensional image data (virtual image data) of the tool T and workpiece W by means of a computer processing on the basis of the parameter stored in the camera parameter storage section 12 and the model data stored in the first model data storage section 13.

Figure 6:
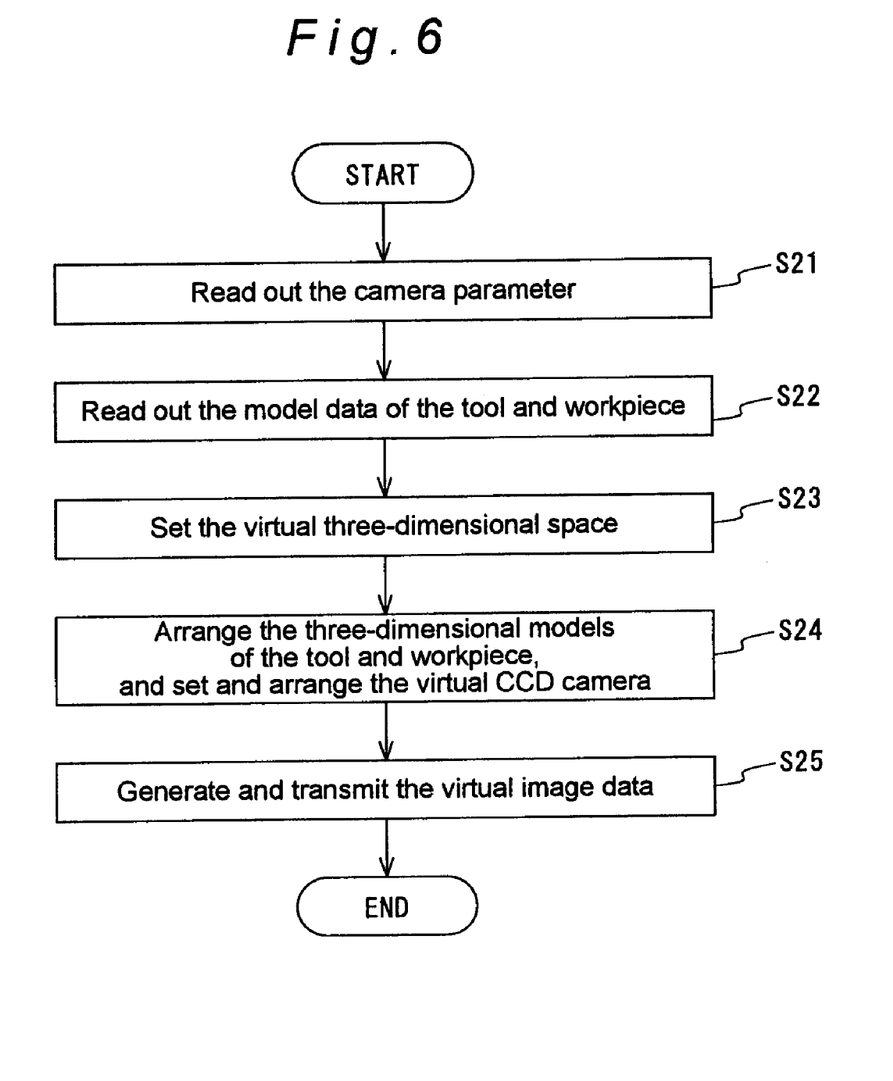
FIG. 6 is a flow chart showing a series of processes in the virtual image generation processing section of the embodiment.

Specifically, the virtual image generation processing section 15 is adapted to perform a series of processes such as shown in FIG. 6. First, the virtual image generation processing section 15 reads out the parameter stored in the camera parameter storage section 12 (step S21). Thereafter, the virtual image generation processing section 15 reads out the model data of the tool T and workpiece W stored in the first model data storage section 13 (step S22).

Next, the virtual image generation processing section 15 virtually sets a three-dimensional space having the same coordinate system as the coordinate system of the machine tool 50 (step S23). Thereafter, the virtual image generation processing section 15 arranges three-dimensional models of the tool T and workpiece W in the three-dimensional space on the basis of the read parameters and model data of the tool T and workpiece W, and simultaneously sets and arranges a virtual CCD camera 15a (step S24). At this time, the virtual CCD camera 15a is arranged at the same position and in the same orientation as those of the actual CCD camera 11 on the basis of the read extrinsic parameters. Therefore, the view point of the virtual CCD camera 15a matches the view point of the actual CCD camera 11. Further, the intrinsic parameters of the virtual CCD camera 15a are set to be the same as the intrinsic parameters of the actual CCD camera 11 on the basis of the read intrinsic parameters. Therefore, the condition of the virtual CCD camera 15a matches that of the actual CCD camera 11.

Thereafter, two-dimensional image data which is assumed to be obtained when the tool T and workpiece W represented by three-dimensional models are imaged by the virtual CCD camera 15a is generated, and the generated two-dimensional image data is transmitted to the rendering processing section 17 (step S25). Examples of the virtual image generated by the virtual image generation processing section 15 are shown in FIGS. 3(b) and 4(b). Although the geometries of the spindle 55 and the table 56 are indicated by two-dot chain lines in FIGS. 3(b) and 4(b), it is only the tool T and the workpiece W that is obtained as a virtual image.

The timing control section 16 synchronizes the imaging timings of the actual CCD camera 11 and the virtual CCD camera 15a. By this synchronization of timing, the actual tool T and the tool T and workpiece W represented by three-dimensional models are imaged at the same timing.

The rendering processing section 17 generates composite image data on the basis of the two-dimensional image data (actual image data) outputted from the actual CCD camera 11 and the two-dimensional image data (virtual image data) transmitted from the virtual image generation processing section 15 and displays the generated composite image data on the screen display device 18.

Specifically, on the basis of the actual image data and virtual image data related to the same timing which are obtained from the actual CCD camera 11 and the virtual image generation processing section 15, respectively, the rendering processing section 17 in turn generates composite image data by superimposing the virtual image on the actual image. The composite image data generated in this way is in turn displayed on the screen display device 18. The rendering processing section 17 is adapted to make the virtual image translucent and superimpose it when superimposing the virtual image on the actual image. Because the coordinate system set to the actual image and the coordinate system set to the virtual image are the same, the virtual images of the tool T and workpiece W are superimposed on the corresponding positions in the actual image.

Examples of the composite image generated by the rendering processing section 17 are shown in FIGS. 3(c) and 4(c). In FIG. 3(c), an image which is generated by superimposing a virtual image including the tool T and the workpiece W on an actual image including the tool T is shown, and in FIG. 4(c), an image which is generated by superimposing a virtual image including the tool T and the workpiece W on an actual image including the tool T and the workpiece W is shown. When the positions and geometries match between the actual tool T and workpiece W and the model data thereof, the tool T and workpiece W in the virtual image are superimposed on the positions of the tool T and workpiece W in the actual image. When the positions and geometries do not match between the actual tool T and workpiece W and the model data thereof, as shown in FIG. 4(c), the virtual image is superimposed so that the tool T and workpiece W in the virtual image are shifted from the positions of the tool T and workpiece W in the actual image. In FIG. 4(c), an image in which the positions of the workpieces W do not match is shown.

Similarly to the first model data storage section 13, in the second model data storage section 19, for example, the previously generated data of the three-dimensional model of the entire machine tool 50 is stored.

The interference check processing section 20 checks whether the movements of the first saddle 52, second saddle 53 and spindle head 54 result in interference between the bed 51, the first saddle 52, the second saddle 53, the spindle head 54, the spindle 55, the table 56, the tool T and the workpiece W, on the basis of the model data stored in the second model data storage section 19 and the predicted positions transmitted from the numerical control device 61.

Figure 7:
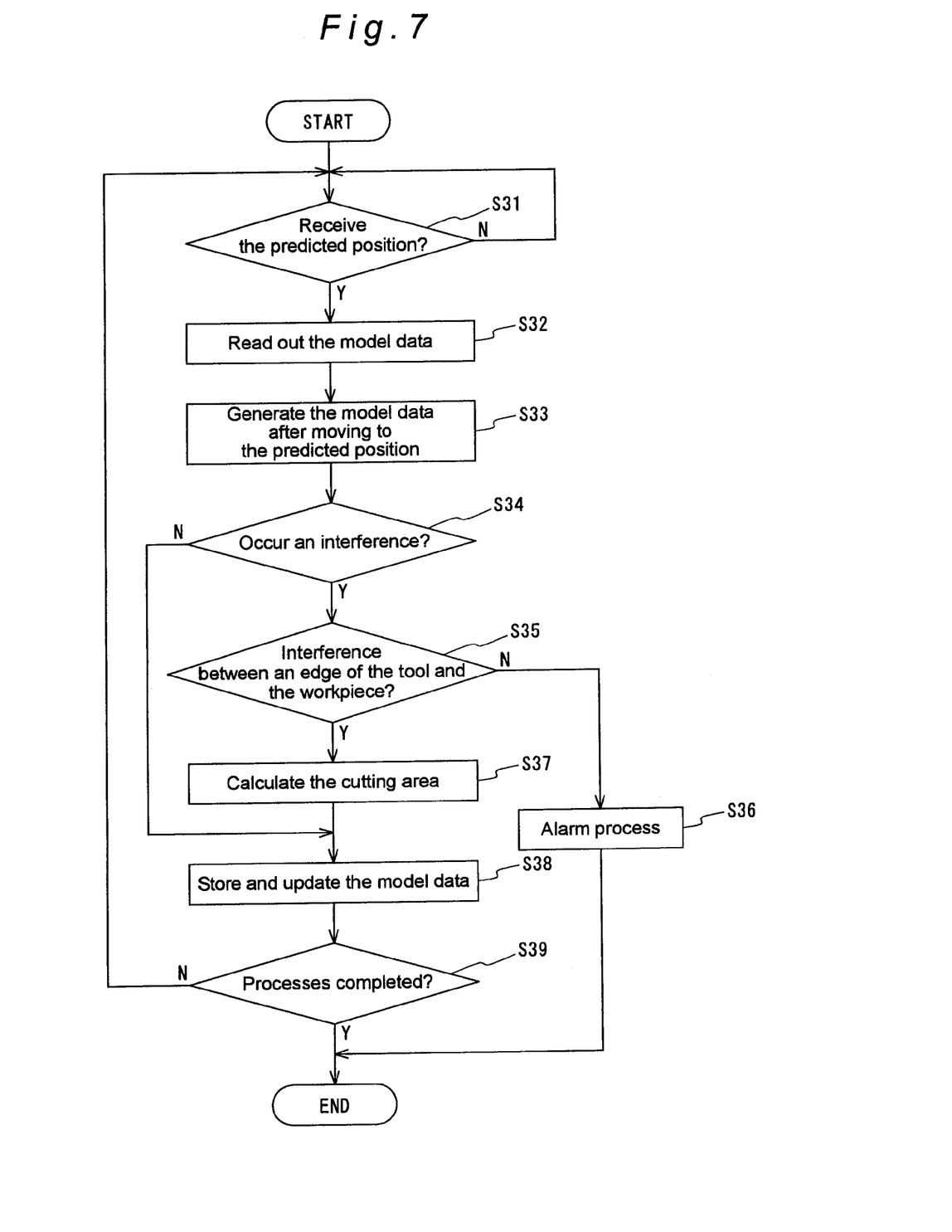
FIG. 7 is a flow chart showing a series of processes in an interference check processing section of the embodiment.

Specifically, the interference check processing section 20 is adapted to perform a series of processes such as shown in FIG. 7. First, the interference check processing section 20 checks whether the predicted positions transmitted from the numerical control device 61 are received (step S31). When receiving the predicted positions, the interference check processing section 20 reads out the model data of the entire machine tool 50 stored in the second model data storage section 19 (step S32), and generates model data of the first saddle 52, second saddle 53, and spindle head 54 which are moved to their respective predicted positions (step S33).

Thereafter, on the basis of the generated model data, the interference check processing section 20 checks whether the bed 51, the first saddle 52, the second saddle 53, the spindle head 54, the spindle 55, the table 56, the tool T and the workpiece W interfere with one another, that is, whether a contact portion or an overlap portion exists between these model data (step S34).

When determining that a contact portion or an overlap portion exists between the model data, the interference check processing section 20 further checks whether the contact or the overlap occurs between an edge of the tool T and the workpiece W (step S35). When determining that it does not occur between the edge of the tool T and the workpiece W, the interference check processing section 20 determines that the interference occurs between the bed 51, the first saddle 52, the second saddle 53, the spindle head 54, the spindle 55, the table 56, the tool T and the workpiece W, and transmits an alarm signal to the numerical control device 61 to halt the operation, and an alarm is displayed on the screen display device 18 (step S36).

On the other hand, when determining, in step S35, that the contact or the overlap occurs between the edge of the tool T and the workpiece W, the interference check processing section 20 determines that it is a machining of the workpiece W, not interference. And the interference check processing section 20 calculates the cutting area by means of Boolean calculation (step S37), and then performs the process of step S38.

Further, also when determining, in step S34, that neither the contact nor the overlap exists between the model data, the interference check processing section 20 performs the process of step S38. In step S38, the generated model data is stored in the second model data storage section 19 to update the model data in the second model data storage section 19. When there is a cutting area, the model data of the workpiece W is updated so that the cutting area is removed.

The processes of steps S31 to S38 are repeated until the termination of the interference check processing (step S39).

According to the machining simulation apparatus 1 of the present embodiment configured in this way, a machining simulation is performed as described below. The machining simulation is preformed in a state where the workpiece W is not mounted on the table 56, for example.

First, the camera parameter of the actual CCD camera 11 is stored in the camera parameter storage section 12, and the model data of the entire machine tool 50 is stored in each of the model data storage sections 13 and 19.

Thereafter, when the feed mechanisms 57, 58 and 59 and the spindle motor 60 are driven by the numerical control device 61 on the basis of an operation command, the model data of the entire machine tool 50 in the first model data storage section 13 is updated by the model data update processing section 14 synchronously with the actual movements of the first saddle 52, second saddle 53 and spindle head 54 on the basis of the operation command obtained from the numerical control device 61.

An area including the spindle 55 to which the tool T is mounted and the table 56 on which the workpiece W is not mounted is imaged by the actual CCD camera 11 at a certain time interval, and actual image data is generated (see FIG. 3(a)). And simultaneously virtual image data of the tool T and workpiece W represented by three-dimensional models is generated by the virtual image generation processing section 15 on the basis of the parameter in the camera parameter storage section 12 and the model data in the first model data storage section 13 (see FIG. 3(b)). This virtual image data is image data which is assumed to be obtained when the tool T and workpiece W represented by three-dimensional models are imaged by the virtual CCD camera 15a having the same condition as the actual CCD camera 11 from the same view point and on the same timing as those of the actual CCD camera 11.

Thereafter, on the basis of the actual image data generated by the actual CCD camera 11 and the virtual image data generated by the virtual image generation processing section 15, composite image data which is generated by superimposing a translucent virtual image on an actual image is generated by the rendering processing section 17, and the generated composite image is displayed on the screen display device 18 (see FIG. 3(c)). The operator can check a moving state of the tool T and a machining condition through the image which is displayed in this way.

While the feed mechanisms 57, 58 and 59 and the spindle motor 60 are operated, the interference check processing section 20 checks whether the bed 51, the first saddle 52, the second saddle 53, the spindle head 54, the spindle 55, the table 56, the tool T and the workpiece W interfere with one another, on the basis of the model data in the second model data storage section 19 and the predicted positions transmitted from the numerical control device 61. When occurrence of interference is confirmed, an alarm signal is transmitted from the interference check processing section 20 to the numerical control device 61 to halt the feed mechanisms 57, 58 and 59 and the spindle motor 60. Because the interference check processing is performed on the basis of the predicted positions, the feed mechanisms 57, 58 and 59 are halted before the bed 51, the first saddle 52, the second saddle 53, the spindle head 54, the spindle 55, the table 56, the tool T and the workpiece W actually interference with one another.

When the NC program has no problem in this machining simulation, the workpiece W is mounted on the table 56. And then an area including the spindle 55 to which the tool T is mounted and the table 56 on which the workpiece W is mounted is imaged by the actual CCD camera 11, and two-dimensional image data (actual image data) thereof is generated (see FIG. 4(a)). Further, virtual image data of the tool T and workpiece W represented by three-dimensional models is generated by the virtual image generation processing section 15 (see FIG. 4(b)).

Next, composite image data is generated by the rendering processing section 17 superimposing the virtual image data on the actual image data, and the generated composite image is displayed on the screen display device 18 (see FIG. 4(c)). The operator can check, through the image which is displayed in this way, whether the model data of the tool T and workpiece W match the actual geometries of the tool T and workpiece W, and whether the arrangement position of the workpiece W in the virtual three-dimensional space matches the actual arrangement position thereof.

Thus, according to the machining simulation apparatus 1 of the present embodiment, composite image which is generated by superimposing a translucent virtual image on an actual image is displayed on the screen display device 18. Thereby, the operator can check the movements of the tool T and workpiece W represented by virtual images while checking the actual state of the machine tool 50. Therefore, it is possible to perform a more realistic and accurate machining simulation.

Although the images of the tool T and workpiece W are obtained from the virtual CCD camera 15a, if the model data of the tool T and workpiece W match the actual geometries thereof and the arrangement position of the workpiece W in the virtual three-dimensional space matches the actual arrangement position thereof, it is not necessary to actually operate the machine tool 50 after performing the machining simulation to verify the NC program. Therefore, the NC program verification can be completed only by this machining simulation, which is efficient.

The virtual image of the tool T and workpiece W is translucent, thereby, it is possible to check the actual image through this virtual image. Therefore, the operator can compare the tool T and workpiece W in the virtual image and the tool T and workpiece W in the actual image to check whether they match. When they match, it is possible to omit the actual operation of the machine tool 50 to verify the NC program.

Thus, one embodiment of the present invention has been described above. However, specific modes in which the present invention can be realized are not limited thereto.

In the above embodiment, the virtual image generation processing section 15 is adapted to generate two-dimensional image data of the tool T and workpiece W. However, because jigs are used when fixing the workpiece W on the table 56, the virtual image generation processing section 15 may be adapted to generate two-dimensional image data of the tool T, workpiece W and jigs. When configured in this way, it is possible to perform an even more realistic and accurate machining simulation. Further, by comparing the jigs in the virtual image and the jigs in the actual image, it is possible to check whether the model data of the jigs match the actual geometries thereof, and whether the arrangement positions of the jigs in the three-dimensional space match the actual arrangement positions thereof.

In the above embodiment, the machining simulation is performed in a state where the tool T is mounted to the spindle 55 and the workpiece W is not mounted on the table 56. However, it is not limited thereto, and the machining simulation may be performed in a state where the tool T is not mounted to the spindle 55 and the workpiece W is mounted on the table 56, or in a state where the tool T is not mounted to the spindle 55 and the workpiece W is not mounted on the table 56.

Further, the arrangement position and the number of the actual CCD camera 11 are not limited to those in the above embodiment. For example, an actual CCD camera 11 may be arranged at each corner of the bed 51. When a plurality of CCD cameras 11 are arranged, the virtual image generation processing section 15 sets the same number of virtual CCD cameras 15a as that of the actual CCD cameras 11. Further, when a plurality of actual CCD cameras 11 and a plurality of virtual CCD cameras 15a are provided, a composite image corresponding to the operator-selected actual CCD camera 11 and corresponding virtual CCD camera 15a may be displayed on the screen display device 18, or the screen display device 18 may be divided into a plurality of display areas, in each of which a composite image corresponding to one of the actual CCD camera 11 and corresponding virtual CCD camera 15a may be displayed.

The interference check processing section 20 may be adapted to receive from the numerical control device 61 a command to operate the first saddle 52, second saddle 53 and spindle head 54 or the present positions of the first saddle 52, second saddle 53 and spindle head 54, and check whether interference occurs, on the basis of the received operation command or present positions and interference determining areas set outside the model of the bed 51, the first saddle 52, the second saddle 53, the spindle head 54, the spindle 55, the table 56, the tool T and the workpiece W. Specifically, the interference check processing section 20 determines that interference occurs when the model data of the first saddle 52, second saddle 53, and spindle head 54 intrude into the interference determining areas.

Further, the machine tool 50 provided with the machining simulation apparatus 1 is not limited, and any machine tool 50 is acceptable. For example, the machining simulation apparatus 1 may be provided in a lathe or the like instead of the machining center such as the above embodiment.

Reference Signs List
  1 Machining simulation apparatus
  11 Actual CCD camera
  12 Camera parameter storage section
  13 First model data storage section
  14 Model data update processing section
  15 Virtual image generation processing section
  16 Timing control section
  17 Rendering processing section
  18 Screen display device
  19 Second model data storage section
  20 Interference check processing section
  50 Machine tool
  55 Spindle
  56 Table
  61 Numerical control device Citation List Patent Literature Japanese Unexamined Patent Application Publication No. 2006-85485

The invention claimed is:

1. A machining simulation method of performing a machining simulation according to an NC program in a machine tool having tool holding means for holding a tool, workpiece holding means for holding a workpiece, drive means for operating one or both of the holding means, drive control means for controlling the operation of the drive means according to operation commands for the one or both of the holding means extracted from the NC program, and screen display means for displaying image data, the machining simulation method comprising:

an actual operation step in which one or both of the holding means is actually operated by controlling the drive means by means of the drive control means according to the operation commands, the one or both of the holding means being operated in a state where one or both of them do not hold the tool or the workpiece;

an actual image generating step in which the tool holding means and the workpiece holding means during the actual operation are imaged by actual imaging means from a predetermined view point at a certain time interval and actual two-dimensional image data thereof is generated in turn;

a model generating step in which, on the basis of data on three-dimensional models of the holding means, the tool and the workpiece, three-dimensional model data for the holding means, the tool, and the workpiece being in a state where their corresponding three-dimensional models are continuously operated synchronously with the actual operation of the holding means according to the operation commands is continuously generated in turn;

a virtual image generating step in which a three-dimensional space is virtually set, virtual imaging means having the same condition as the actual imaging means is virtually arranged in the virtual three-dimensional space and the three-dimensional models of the tool and the workpiece continuously generated in the model data generating step are arranged in the same virtual three-dimensional space while being updated in turn, and virtual two-dimensional image data which is obtained when the three-dimensional models of the tool and the workpiece are imaged by the virtual imaging means from the same view point and at the same timing as those of the actual imaging means is generated in turn; and a rendering step in which the actual two-dimensional image data and the virtual two-dimensional image data at the same timing generated in the actual image generating step and the virtual image generating step, respectively, are synthesized and composite image data in which a virtual two-dimensional image of the virtual two-dimensional image data is superimposed on an actual two-dimensional image of the actual two-dimensional image data is generated in turn and displayed on the screen display means.

2. A machining simulation apparatus performing a machining simulation according to an NC program in a machine tool having a tool holding means for holding a tool, workpiece holding means for holding a workpiece, a drive means for operating one or both of the holding means, a drive control means for controlling the operation of the drive means according to operation commands for the one or both of the holding means extracted from the NC program, and screen display means for displaying image data, the machining simulation apparatus comprising:

actual imaging means for imaging the tool holding means and the workpiece holding means which are operated according to the operation commands and which are in a state where one or both of them do not hold the tool or the workpiece from a predetermined view point at a certain time interval and in turn generating actual two-dimensional image data thereof;

model data storage means for storing data on three-dimensional models of the holding means, the tool and the workpiece;

model data updating means for receiving the operation commands from the drive control means, in turn generating continuously, on the basis of the three-dimensional model data stored in the model data storage means, model data for the holding means, the tool and the workpiece being in a state where their corresponding three-dimensional models are continuously operated synchronously with the actual operation of the holding means according to the received operation commands, and updating the three-dimensional model data stored in the model data storage means with the generated three-dimensional model data;

virtual image generating means for virtually setting a three-dimensional space, virtually arranging virtual imaging means having the same conditions as the actual imaging means in the virtual three-dimensional space and arranging the three-dimensional models of the tool and the workpiece stored in the model data storage means in the same three-dimensional space while in turn reading out and updating them, and in turn generating virtual two-dimensional image data which is obtained when the three-dimensional models of the tool and the workpiece are imaged by the virtual imaging means from the same view point and at the same timing as those of the actual imaging means; and rendering means for synthesizing the actual two-dimensional image data and the virtual two-dimensional image data at the same timing by the actual imaging means and the virtual image generating means, respectively, in turn generating composite image data in which virtual two-dimensional image of the virtual two-dimensional image data is superimposed on an actual two-dimensional image of the actual two-dimensional image data and displaying the generated composite image data on the screen display means.

3. The machining simulation apparatus according to claim 2, wherein
the actual imaging means is configured to image the tool held by the tool holding means and the workpiece held by the workpiece holding means from a predetermined view point at a certain time interval and in turn generate actual two-dimensional image data thereof, and
the rendering means is configured to generate the composite image data in which the virtual two-dimensional image is translucent and display the generated composite image data on the screen display means.

4. A machining simulation method of performing a machining simulation according to an NC program in a machine tool having a tool holder for holding a tool, a workpiece holder for holding a workpiece, a driver for operating one or both of the holders, a drive controller for controlling the operation of the driver according to operation commands for the one or both of the holders extracted from the NC program, and a screen display for displaying image data,
the machining simulation method comprising:
an actual operation step in which one or both of the holders are actually operated by controlling the driver by means of the drive controller according to the operation commands, the one or both of the holders being operated in a state where one or both of them do not hold the tool or the workpiece;
an actual image generating step in which the tool holder and the workpiece holder during the actual operation are imaged by an actual imaging camera from a predetermined viewpoint at a certain time interval and actual two-dimensional image data thereof is generated in turn;
a model generating step in which, on the basis of data on three-dimensional models of the holders, the tool and the workpiece, three-dimensional model data for the holders, the tool, and the workpiece being in a state where their corresponding three-dimensional models are continuously operated synchronously with the actual operation of the holders according to the operation commands is continuously generated in turn;
a virtual image generating step in which a three-dimensional space is virtually set, a virtual imaging camera having the same conditions as the actual imaging camera is virtually arranged in the virtual three-dimensional space and the three-dimensional models of the tool and the workpiece continuously generated in the model data generating step are arranged in the same virtual three-dimensional space while being updated in turn, and virtual two-dimensional image data which is obtained when the three-dimensional models of the tool and the workpiece are imaged by the virtual imaging camera from the same view point and at the same timing as those of the actual imaging camera is generated in turn; and
a rendering step in which the actual two-dimensional image data and the virtual two-dimensional image data at the same timing generated in the actual image generating step and the virtual image generating step, respectively, are synthesized and composite image data in which a virtual two-dimensional image of the virtual two-dimensional image data is superimposed on an actual two-dimensional image of the actual two-dimensional image data is generated in turn and displayed on the screen display.

5. A machining simulation apparatus performing a machining simulation according to an NC program in a machine tool having a tool holder for holding a tool, a workpiece holder for holding a workpiece, a driver for operating one or both of the holder, a drive controller for controlling the operation of the driver according to operation commands for the one or both of the holders extracted from the NC program, and a screen display for displaying image data,
the machining simulation apparatus comprising:
an actual imaging camera for imaging the tool holder and the workpiece holder which are operated according to the operation commands and which are in a state where one or both of them do not hold the tool or the workpiece from a predetermined view point at a certain time interval and in turn generating actual two-dimensional image data thereof;
a model data storage for storing data on three-dimensional models of the holders, the tool and the workpiece;
a model data updater for receiving the operation commands from the drive controller, in turn generating continuously, on the basis of the three-dimensional model data stored in the model data storage, three-dimensional model data for the holders, the tool and the workpiece being in a state where their corresponding three-dimensional models are continuously operated synchronously with the actual operation of the holder according to the received operation commands, and updating the three-dimensional model data stored in the model data storage with the generated three-dimensional model data;
a virtual image generator for virtually setting a three-dimensional space, virtually arranging a virtual imaging camera having the same conditions as the actual imaging camera in the virtual three-dimensional space and arranging the three-dimensional models of the tool and the workpiece stored in the model data storage in the same three-dimensional space while in turn reading out and updating them, and in turn generating virtual two-dimensional image data which is obtained when the three-dimensional models of the tool and the workpiece are imaged by the virtual imaging camera from the same view point and at the same timing as those of the actual imaging camera; and
a rendering processor for synthesizing the actual two-dimensional image data and the virtual two-dimensional image data at the same timing generated by the actual imaging camera and the virtual image generator, respectively, in turn generating composite image data in which a virtual two-dimensional image of the virtual two-dimensional image data is superimposed on an actual two-dimensional image of the actual two-dimensional image data and displaying the generated composite image data on the screen display.

6. The machining simulation apparatus according to claim 2, wherein
the actual imaging camera is configured to image the tool held by the tool holder and the workpiece held by the workpiece holder from a predetermined viewpoint at a certain time interval and in turn generate actual two-dimensional image data thereof, and
the rendering processor is configured to generate the composite image data in which the virtual two-dimensional image is translucent and display the generated composite image data on the screen display.

* * * * *